(12) United States Patent
Glover

(10) Patent No.: US 11,182,551 B2
(45) Date of Patent: *Nov. 23, 2021

(54) SYSTEM AND METHOD FOR DETERMINING DOCUMENT VERSION GENEOLOGY

(71) Applicant: Workshare, Ltd., London (GB)

(72) Inventor: Robin Glover, London (GB)

(73) Assignee: Workshare Ltd., London (GB)

( * ) Notice: Subject to any disclaimer, the term of this patent is extended or adjusted under 35 U.S.C. 154(b) by 487 days.

This patent is subject to a terminal disclaimer.

(21) Appl. No.: 16/152,992

(22) Filed: Oct. 5, 2018

(65) Prior Publication Data

US 2019/0042558 A1 Feb. 7, 2019

Related U.S. Application Data

(63) Continuation-in-part of application No. 15/819,640, filed on Nov. 21, 2017, which is a continuation of
(Continued)

(51) Int. Cl.
| | |
|---|---|
| *G06F 16/13* | (2019.01) |
| *G06F 16/28* | (2019.01) |
| *G06F 16/21* | (2019.01) |
| *G06F 16/93* | (2019.01) |
| *G06F 40/205* | (2020.01) |

(Continued)

(52) U.S. Cl.
CPC .............. *G06F 40/205* (2020.01); *G06F 8/71* (2013.01); *G06F 16/13* (2019.01); *G06F 16/219* (2019.01); *G06F 16/285* (2019.01); *G06F 16/93* (2019.01); *G06F 40/166* (2020.01); *G06F 40/197* (2020.01); *G06N 5/003* (2013.01)

(58) Field of Classification Search
CPC .... G06F 40/205; G06F 40/166; G06F 40/197; G06F 16/219; G06F 16/93; G06F 8/71; G06F 16/13; G06F 16/285; G06N 5/003
USPC ......................................... 707/737, 802, 609
See application file for complete search history.

(56) References Cited

U.S. PATENT DOCUMENTS

| | | | |
|---|---|---|---|
| 4,479,195 | A | 10/1984 | Herr et al. |
| 4,949,300 | A | 8/1990 | Christenson et al. |

(Continued)

FOREIGN PATENT DOCUMENTS

| | | |
|---|---|---|
| JP | 10177650 | 6/1998 |
| JP | 2004265267 | 9/2004 |

(Continued)

OTHER PUBLICATIONS

Pattison, Ted et al. Inside Microsoft® SharePoint® 2010. Critical Path Training, LLC © 2011.

(Continued)

*Primary Examiner* — Michael Pham
(74) *Attorney, Agent, or Firm* — Nixon Peabody LLP

(57) ABSTRACT

This invention discloses a novel system and method for determining the genealogy of versions of a document by inspection of content extracted from the document. In one embodiment, the invention extracts a set of revision identifier values from each version of a document and then applies logical rules to the extracted set of revision identifier values to determine which versions of the document are ancestors of the other versions.

20 Claims, 2 Drawing Sheets

Related U.S. Application Data application No. 14/980,173, filed on Dec. 28, 2015, now Pat. No. 10,133,723.

(60) Provisional application No. 62/424,811, filed on Nov. 21, 2016, provisional application No. 62/097,190, filed on Dec. 29, 2014.

(51) Int. Cl.
*G06F 8/71* (2018.01)
*G06N 5/00* (2006.01)
*G06F 40/166* (2020.01)
*G06F 40/197* (2020.01)

(56) References Cited

U.S. PATENT DOCUMENTS

| | | | |
|---|---|---|---|
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,619,649 A | 4/1997 | Kovnat et al. |
| 5,634,062 A | 5/1997 | Shimizu et al. |
| 5,671,428 A | 9/1997 | Muranaga et al. |
| 5,699,427 A | 12/1997 | Chow et al. |
| RE35,861 E | 7/1998 | Queen |
| 5,787,175 A | 7/1998 | Carter |
| 5,787,444 A | 7/1998 | Gerken et al. |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,890,177 A | 3/1999 | Moody et al. |
| 5,897,636 A | 4/1999 | Kaeser |
| 5,898,836 A | 4/1999 | Freivald et al. |
| 6,003,060 A | 12/1999 | Aznar et al. |
| 6,012,087 A | 1/2000 | Freivald et al. |
| 6,029,175 A | 2/2000 | Chow et al. |
| 6,038,561 A | 3/2000 | Snyder et al. |
| 6,049,804 A | 4/2000 | Burgess et al. |
| 6,067,551 A | 5/2000 | Brown et al. |
| 6,088,702 A | 7/2000 | Plantz et al. |
| 6,128,635 A | 10/2000 | Ikeno |
| 6,145,084 A | 11/2000 | Zuili et al. |
| 6,189,019 B1 | 2/2001 | Blumer et al. |
| 6,212,534 B1 | 4/2001 | Lo et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,317,777 B1 | 11/2001 | Skarbo et al. |
| 6,321,265 B1 | 11/2001 | Najork et al. |
| 6,327,611 B1 | 12/2001 | Everingham |
| 6,336,123 B2 | 1/2002 | Inoue et al. |
| 6,351,755 B1 | 2/2002 | Najork et al. |
| 6,356,937 B1 | 3/2002 | Montville et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,505,237 B2 | 1/2003 | Beyda et al. |
| 6,513,050 B1 | 1/2003 | Williams et al. |
| 6,547,829 B1 | 4/2003 | Meyerzon et al. |
| 6,556,982 B1 | 4/2003 | McGaffey et al. |
| 6,560,620 B1 | 5/2003 | Ching |
| 6,584,466 B1 | 6/2003 | Serbinis et al. |
| 6,591,289 B1 | 7/2003 | Britton |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,662,212 B1 | 12/2003 | Chandhok et al. |
| 6,738,762 B1 | 5/2004 | Chen et al. |
| 6,745,024 B1 | 6/2004 | DeJaco et al. |
| 6,832,202 B1 | 12/2004 | Schuyler et al. |
| 6,918,082 B1 | 7/2005 | Gross |
| 7,035,427 B2 | 4/2006 | Rhoads |
| 7,085,735 B1 | 8/2006 | Hall et al. |
| 7,107,518 B2 | 9/2006 | Ramaley et al. |
| 7,113,615 B2 | 9/2006 | Rhoads et al. |
| 7,152,019 B2 | 12/2006 | Tarantola et al. |
| 7,181,492 B2 | 2/2007 | Wen et al. |
| 7,194,761 B1 | 3/2007 | Champagne |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,321,864 B1 | 1/2008 | Gendler |
| 7,356,704 B2 | 4/2008 | Rinkevich et al. |
| 7,434,164 B2 | 10/2008 | Salesin et al. |
| 7,454,778 B2 | 11/2008 | Pearson et al. |
| 7,496,841 B2 | 2/2009 | Hadfield et al. |
| 7,564,997 B2 | 7/2009 | Hamid |
| 7,570,964 B2 | 8/2009 | Maes |
| 7,613,770 B2 | 11/2009 | Li |
| 7,624,447 B1 | 11/2009 | Horowitz et al. |
| 7,627,613 B1 | 12/2009 | Dulitz et al. |
| 7,640,308 B2 | 12/2009 | Antonoff et al. |
| 7,673,324 B2 | 3/2010 | Tirosh et al. |
| 7,680,785 B2 | 3/2010 | Najork |
| 7,685,298 B2 | 3/2010 | Day |
| 7,694,336 B2 | 4/2010 | Rinkevich et al. |
| 7,707,153 B1 | 4/2010 | Petito et al. |
| 7,720,256 B2 | 5/2010 | Desprez et al. |
| 7,730,175 B1 | 6/2010 | Roesch et al. |
| 7,788,235 B1 | 8/2010 | Yeo |
| 7,796,309 B2 | 9/2010 | Sadovsky et al. |
| 7,797,724 B2 | 9/2010 | Calvin |
| 7,818,678 B2 | 10/2010 | Massand |
| 7,844,116 B2 | 11/2010 | Monga |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 7,895,166 B2 | 2/2011 | Foygel et al. |
| 7,903,822 B1 | 3/2011 | Hair et al. |
| 7,941,844 B2 | 5/2011 | Anno |
| 7,958,101 B1 | 6/2011 | Teugels et al. |
| 8,005,277 B2 | 8/2011 | Tulyakov et al. |
| 8,042,112 B1 | 10/2011 | Zhu et al. |
| 8,117,225 B1 | 2/2012 | Zilka |
| 8,145,724 B1 | 3/2012 | Hawks et al. |
| 8,181,036 B1 | 5/2012 | Nachenberg |
| 8,196,030 B1 | 6/2012 | Wang et al. |
| 8,201,254 B1 | 6/2012 | Wilhelm et al. |
| 8,209,538 B2 | 6/2012 | Craigie |
| 8,233,723 B2 | 7/2012 | Sundaresan |
| 8,286,085 B1 | 10/2012 | Denise |
| 8,286,171 B2 | 10/2012 | More et al. |
| 8,301,994 B1 | 10/2012 | Shah |
| 8,316,237 B1 | 11/2012 | Felsher et al. |
| 8,406,456 B2 | 3/2013 | More |
| 8,473,847 B2 | 6/2013 | Glover |
| 8,478,995 B2 | 7/2013 | Alculumbre |
| 8,555,080 B2 | 10/2013 | More et al. |
| 8,572,388 B2 | 10/2013 | Boemker et al. |
| 8,620,872 B1 | 12/2013 | Killalea |
| 8,635,295 B2 | 1/2014 | Mulder |
| 8,732,127 B1 | 5/2014 | Rotterdam et al. |
| 8,776,190 B1 | 7/2014 | Cavage et al. |
| 8,797,603 B1 | 8/2014 | Dougherty et al. |
| 8,839,100 B1 | 9/2014 | Donald |
| 9,092,636 B2 | 7/2015 | More et al. |
| 9,098,500 B1 | 8/2015 | Asokan et al. |

(56) References Cited

U.S. PATENT DOCUMENTS

| | | |
|---|---|---|
| 9,311,624 B2 | 4/2016 | Diament et al. |
| 9,652,485 B1 | 5/2017 | Bhargava et al. |
| 2001/0018739 A1 | 8/2001 | Anderson et al. |
| 2001/0042073 A1 | 11/2001 | Saether et al. |
| 2002/0010682 A1 | 1/2002 | Johnson |
| 2002/0016959 A1 | 2/2002 | Barton et al. |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0073188 A1 | 6/2002 | Rawson, III |
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0009528 A1 | 1/2003 | Sharif et al. |
| 2003/0037010 A1 | 2/2003 | Schmelzer |
| 2003/0046572 A1 | 3/2003 | Newman et al. |
| 2003/0051054 A1 | 3/2003 | Redlich et al. |
| 2003/0061260 A1 | 3/2003 | Rajkumar |
| 2003/0061350 A1 | 3/2003 | Masuoka et al. |
| 2003/0078880 A1 | 4/2003 | Alley et al. |
| 2003/0084279 A1 | 5/2003 | Campagna |
| 2003/0093755 A1 | 5/2003 | Ramakrishnan |
| 2003/0097454 A1 | 5/2003 | Yamakawa et al. |
| 2003/0112273 A1 | 6/2003 | Hadfield |
| 2003/0115273 A1 | 6/2003 | Delia et al. |
| 2003/0131005 A1 | 7/2003 | Berry |
| 2003/0147267 A1 | 8/2003 | Huttunen |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0223624 A1 | 12/2003 | Hamid |
| 2003/0233419 A1 | 12/2003 | Beringer |
| 2003/0237047 A1 | 12/2003 | Borson |
| 2004/0002049 A1 | 1/2004 | Beavers et al. |
| 2004/0031052 A1 | 2/2004 | Wannamaker et al. |
| 2004/0122659 A1 | 6/2004 | Hourihane et al. |
| 2004/0128321 A1 | 7/2004 | Hamer |
| 2004/0148567 A1 | 7/2004 | Jeon et al. |
| 2004/0186851 A1 | 9/2004 | Jhingan et al. |
| 2004/0187076 A1 | 9/2004 | Ki |
| 2004/0225645 A1 | 11/2004 | Rowney et al. |
| 2004/0261016 A1 | 12/2004 | Glass et al. |
| 2005/0021980 A1 | 1/2005 | Kanai |
| 2005/0038893 A1 | 2/2005 | Graham |
| 2005/0055306 A1 | 3/2005 | Miller et al. |
| 2005/0055337 A1 | 3/2005 | Bebo et al. |
| 2005/0071755 A1 | 3/2005 | Harrington et al. |
| 2005/0108293 A1 | 5/2005 | Lipman et al. |
| 2005/0138350 A1 | 6/2005 | Hariharan |
| 2005/0138540 A1 | 6/2005 | Baltus et al. |
| 2005/0204008 A1 | 9/2005 | Shinbrood |
| 2005/0251738 A1 | 11/2005 | Hirano et al. |
| 2005/0251748 A1 | 11/2005 | Gusmorino et al. |
| 2005/0256893 A1 | 11/2005 | Perry |
| 2005/0268327 A1 | 12/2005 | Starikov |
| 2006/0005247 A1 | 1/2006 | Zhang et al. |
| 2006/0013393 A1 | 1/2006 | Ferchichi et al. |
| 2006/0021031 A1 | 1/2006 | Leahy et al. |
| 2006/0047765 A1 | 3/2006 | Mizoi et al. |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069740 A1 | 3/2006 | Ando |
| 2006/0075041 A1 | 4/2006 | Antonoff et al. |
| 2006/0098850 A1 | 5/2006 | Hamid |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0261112 A1 | 11/2006 | Todd et al. |
| 2006/0271947 A1 | 11/2006 | Lienhart et al. |
| 2006/0272024 A1 | 11/2006 | Huang et al. |
| 2006/0277229 A1 | 12/2006 | Koshida et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves et al. |
| 2007/0025265 A1 | 2/2007 | Porras et al. |
| 2007/0027830 A1 | 2/2007 | Simons et al. |
| 2007/0038704 A1 | 2/2007 | Brown et al. |
| 2007/0094510 A1 | 4/2007 | Ross et al. |
| 2007/0100991 A1 | 5/2007 | Daniels et al. |
| 2007/0101154 A1 | 5/2007 | Bardsley et al. |
| 2007/0101413 A1 | 5/2007 | Vishik et al. |
| 2007/0112930 A1 | 5/2007 | Foo et al. |
| 2007/0150443 A1 | 6/2007 | Bergholz et al. |
| 2007/0174766 A1 | 7/2007 | Rubin et al. |
| 2007/0179967 A1 | 8/2007 | Zhang |
| 2007/0192728 A1 | 8/2007 | Finley et al. |
| 2007/0220061 A1 | 9/2007 | Tirosh et al. |
| 2007/0220068 A1 | 9/2007 | Thompson et al. |
| 2007/0239802 A1* | 10/2007 | Razdow ............... G06F 16/93 |
| 2007/0253608 A1 | 11/2007 | Tulyakov et al. |
| 2007/0261099 A1 | 11/2007 | Broussard et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2007/0299880 A1 | 12/2007 | Kawabe et al. |
| 2008/0022003 A1 | 1/2008 | Alve |
| 2008/0028017 A1 | 1/2008 | Garbow et al. |
| 2008/0033913 A1 | 2/2008 | Winburn |
| 2008/0034282 A1 | 2/2008 | Zernik |
| 2008/0034327 A1 | 2/2008 | Cisler et al. |
| 2008/0065668 A1 | 3/2008 | Spence et al. |
| 2008/0080515 A1 | 4/2008 | Tombroff et al. |
| 2008/0082529 A1 | 4/2008 | Mantena et al. |
| 2008/0091465 A1 | 4/2008 | Fuschino et al. |
| 2008/0091735 A1 | 4/2008 | Fukushima et al. |
| 2008/0162527 A1 | 7/2008 | Pizano et al. |
| 2008/0177782 A1 | 7/2008 | Poston et al. |
| 2008/0209001 A1 | 8/2008 | Boyle et al. |
| 2008/0215667 A1 | 9/2008 | Rothbarth et al. |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0310624 A1 | 12/2008 | Celikkan |
| 2008/0320316 A1 | 12/2008 | Waldspurger et al. |
| 2009/0025087 A1 | 1/2009 | Peirson et al. |
| 2009/0030997 A1 | 1/2009 | Malik |
| 2009/0034804 A1 | 2/2009 | Cho et al. |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0083073 A1 | 3/2009 | Mehta et al. |
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |

(56) References Cited

U.S. PATENT DOCUMENTS

| | | |
|---|---|---|
| 2009/0271620 A1 | 10/2009 | Sudhakar |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0173103 A1 | 7/2011 | Batra et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1 | 8/2013 | Tvorun |
| 2014/0032489 A1 | 1/2014 | Hebbar et al. |
| 2014/0115436 A1 | 4/2014 | Beaver et al. |
| 2014/0136497 A1 | 5/2014 | Georgiev |
| 2014/0181223 A1 | 6/2014 | Homsany et al. |
| 2014/0280336 A1 | 9/2014 | Glover |
| 2014/0281872 A1 | 9/2014 | Glover |
| 2015/0026464 A1 | 1/2015 | Hanner et al. |
| 2015/0172058 A1 | 6/2015 | Follis |
| 2016/0350270 A1 | 12/2016 | Nakazawa |

FOREIGN PATENT DOCUMENTS

| | | |
|---|---|---|
| JP | 2007299364 | 11/2007 |
| KR | 1020010078840 | 8/2001 |
| KR | 1020060048686 | 5/2006 |
| KR | 1020080029602 | 4/2008 |
| WO | WO0060504 | 10/2000 |
| WO | 2001052473 A1 | 7/2001 |
| WO | 2002101577 A1 | 12/2002 |

OTHER PUBLICATIONS

PC Magazine "Pure Intranets: Real-Time Internet Collaboration", http://www.zdnet.com/pcmag/featuresgroupware/gpwst.htm, Aug. 30, 2001, 2 pages.

Restriction Requirement dated Jun. 30, 2006 for U.S. Appl. No. 10/136,733, filed Apr. 30, 2002.

Restriction Requirement dated Feb. 14, 2005 for U.S. Appl. No. 10/023,010, filed Dec. 17, 2001, Issued U.S. Pat. No. 7,496,841.

Roussev, et al., "Integrating XML and Object-based Programming for Distributed Collaboration", IEEE, 2000, pp. 254-259.

Sahil Malik. Microsoft SharePoint 2010: Building Solutions for SharePoint 2010 . Apress; 1st ed. edition (Jun. 7, 2010), filed listing only.

Silver, Michael A.; MacDonald, Neil. Plan to Deal with Metadata Issues with Windows Vista. Gartner, Inc.. Dec. 21, 2005.ID No. G00136321.

Simple Mail Transfer Protocol, Internet Engineering Task Force(IETF), RFC 821 (Aug. 1982).

Stephen Voida et al., Share and Share Alike: Exploring the User Interface Affordances of File Sharing, Apr. 22-27, 2006, ACM, pp. 1-10.

Stolfo et al., AMT?MET: Systems for Modeling and Detecting Errant Email. 2003, IEEE 6 pages.

Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.

Sujoy Roy; Qibin Sun; , "Robust Hash for Detecting and Localizing Image Tampering," Image Processing, 2007. ICIP 2007. IEEE International Conference on , vol. 6, No., pp. VI-117-VI-120, Sep. 16, 2007-Oct. 19, 2007.

Tsai, et al., "A document Workspace for Collaboration and Annotation based on XML Technology", Department of Electrical Engineering, 2001, pp. 165-172.

Tuklakov, et al., "Symmetric Hash Functions for Fingerprint Minutiae," International Workshop on Pattern Recognition for Crime Prevention, Security and Surveillance, Bath U.K, Oct. 2, 2005, pp. 30-38.

U.S. Appl. No. 13/789,104, filed Mar. 7, 2013, Gofman.

User Permissions and Permission Levels (SharePoint Foundation 2010)(technet.microsoft.com) (Jan. 4, 2011), https://technet.microsoft.com/en-US/library/cc288074(v=office.14).aspx (last visited Feb. 27, 2017).

V Monga, B.L. Evans Perceptual image hashing via feature points: performance evaluation and tradeoffs IEEE Transactions on Image Processing, 15 (11) (2006), pp. 3453-3466.

Weiss et al., Lightweight document matching for help-desk applications, In: Intelligent Systems and their Applications, IEEE, Vo. 15, Issue:2, pp. 57-61, ISSN 1094-7167, 2000.

Wells et al., "Groupware & Collaboration Support", www.objs.com/survey/groupwar.htm, Aug. 30, 2001, 10 pages.

Workshare Compare Service Technical Quick Start Guide, © 2007 p. 1-10.

Workshare DeltaServer Configuration Guide, © 2003 p. 1-24.

Workshare Ltd. Workshare Protect 4.5 Admin Guide, (c) 2006.

Workshare Ltd. Workshare Protect 4.5 User Guide, (c) 2006.

(56) References Cited

OTHER PUBLICATIONS

Written Opinion of PCT Application No. PCT/US2009/051313, dated Mar. 3, 2010, 3 pages.
Written Opinion PCT Application No. PCT/US2009/056651, dated Apr. 21, 2010, pp. 1-5.
Written Opinion PCT Application No. PCT/US2009/056668 dated Apr. 16, 2010 pp. 1-4.
Written Opinion PCT Application No. PCT/US2009/065019 dated Jun. 4, 2010, p. 1-5.
Written Opinion PCT Application No. PCT/US201 0/043345 dated Apr. 28, 2011, 4 pages.
XP-002257904, "Workshare Debuts Synergy", 2003, 3 pages.
Xuefeng Liang; et al., "Fingerprint Matching Using Minutia Polygons," Pattern Recognition, 2006, ICPR 2006, 18th International Conference on, vol. 1, No. pp. 1046-1049.
Yung et al., Generating Robust Digital Signature for Image/Video Authentication, Multimedia and Security Workshop at ACM Multimedia '98, Bristol, U.K., Sep. 1998.
International Search Report of PCT Application No. PCT/IB2002/005821, dated Jan. 30, 2004, 6 pages.
International Search Report of PCT Application No. PCT/US2009/051313, dated Mar. 3, 2010, 3 pages.
International Search Report of PCT Application No. PCT/US2009/056651, dated Apr. 21, 2010, pp. 1-3.
International Search Report of PCT Application No. PCT/US2009/056668 dated Apr. 16, 2010, pp. 1-9.
International Search Report of PCT Application No. PCT/US2009/056668, dated Apr. 16, 2010, 9 pages.
International Search Report of PCT Application No. PCT/US2009/064919 dated Jul. 1, 2010, pp. 1-3.
International Search Report of PCT Application No. PCT/US2009/065019 dated Jun. 4, 2010, pp. 1-6.
International Search Report of PCT Application No. PCT/US2010/043345, dated Apr. 28, 2011, 3 pages.
International Search Report PCT/US2010/043345 dated Apr. 28, 2011, 3 pages.
Jain, Pravin. The class of JAVA. Aug. 12, 2010, only viewed filed listing.
Jamison, Scott. Essential SharePoint 2010: Overview, Governance, and Planning. Addison-Wesley Professional; 1 edition (Aug. 22, 2010), only viewed filed listing.
Karnouskos et al., Active Electronic Mail, 2002, ACM 6 pages.
Kaushik et al., Email Feedback: A Policy based Approach to Overcoming False Positives, 2005, 10 pages.
Lightfoot, Johnathan and Beckett, Chris. Plain & Simple Microsoft® SharePoint® 2010. O'Reilly Media, Inc. Copyright © 2010.
Londer, Olga and Coventry, Penelope. Step by Step Microsoft® SharePoint® Foundation 2010. Microsoft Press. ISBN 978-0-7356-2726-0. Copyright © 2011.
M. Eric Johnson et al., The Evolution of the Peer-to-Peer File Sharing Industry and the Security Risks for Users, Jan. 7-10, 2008, IEEE, pp. 1-10.
Microsoft, "Microsoft XP, Product Guide", pp. 1-26, 2001.
Mike Heck. Keep Sensitive Data Out of E-Mails. InfoWorld.com. Apr. 24, 2006.
Nathaniel S. Good et al., Usability and privacy: a study of KaZaA P2P file-sharing, Apr. 5-10, 2003, ACM, vol. No. 5, Issue No. 1, pp. 137-144.
Non-Final Office Action dated Apr. 27, 2012 in Co-Pending U.S. Appl. No. 12/275,185, filed Nov. 20, 2008.
Non-final office action issued for U.S. Appl. No. 13/799,067 dated Oct. 30, 2014.
Non-Final Office Action dated Apr. 26, 2013 in Co-Pending U.S. Appl. No. 13/659,817 of More, S., filed Oct. 24, 2012.
Non-Final Office Action dated Aug. 1, 2012 in Co-Pending U.S. Appl. No. 12/621,429, filed Nov. 18, 2009.
Non-Final Office Action dated Aug. 13, 2013 in co-pending U.S. Appl. No. 13/306,819 by Glover, R.W., filed Nov. 29, 2011.
Non-Final Office Action dated Dec. 22, 2011 in Co-Pending U.S. Appl. No. 12/209,082.
Non-Final Office Action dated Dec. 6, 2012 in co-pending U.S. Appl. No. 13/306,798, filed Nov. 29, 2011.
Non-Final Office Action dated Jan. 9, 2012 in Co-Pending U.S. Appl. No. 12/177,043, filed Jul. 21, 2008.
Non-Final Office Action dated Mar. 11, 2011 in Co-pending U.S. Appl. No. 12/209,096, filed Sep. 11, 2008.
Non-Final Office Action dated Mar. 16, 2006 for U.S. Appl. No. 10/023,010, filed Dec. 17, 2001, Issued U.S. Pat. No. 7,496,841.
Non-Final Office Action dated Mar. 18, 2013 in Co-Pending U.S. Appl. No. 13/659,793 of More, S., filed Oct. 24, 2012.
Non-Final Office Action dated Mar. 20, 2006 in Co-pending U.S. Appl. No. 10/136,733, filed Apr. 30, 2002.
Non-Final Office Action dated Mar. 20, 2006 in U.S. Appl. No. 10/136,733, filed Apr. 30, 2002.
Non-Final Office Action dated May 17, 2013 in co-pending U.S. Appl. No. 13/306,765 by Mulder, S.P.M., filed Nov. 29, 2011.
Non-Final Office Action dated May 7, 2008 in Co-pending U.S. Appl. No. 10/023,010, filed Dec. 17, 2001.
Non-Final Office Action dated Sep. 19, 2011 for U.S. Appl. No. 12/177,043, filed Jul. 21, 2008.
Non-Final Office Action dated Sep. 19, 2012 in Co-Pending U.S. Appl. No. 12/844,818 by Glover, R., filed Jul. 27, 2010.
Notice of Allowance dated Aug. 19, 2012 in Co-Pending U.S. Appl. No. 12/177,043, filed Jul. 21, 2008.
Notice of Allowance dated Jul. 8, 2013 in Co-Pending U.S. Appl. No. 12/209,082 by S. More et al. filed Sep. 11, 2008.
Notice of Allowance dated Jun. 26, 2012 in Co-Pending U.S. Appl. No. 12/275,185 of More, S., filed Nov. 20, 2008.
Notice of Allowance dated Mar. 13, 2013 in Co-Pending U.S. Appl. No. 12/844,818 by Glover, R., filed Jul. 27, 2010.
Notice of Allowance dated Oct. 2, 2012, in Co-Pending U.S. Appl. No. 12/275,185 by More, S., filed Nov. 20, 2008.
Notice of Allowance dated Oct. 24, 2008 in Co-pending U.S. Appl. No. 10/023,010, filed Dec. 17, 2001.
Notice of Allowance dated Sep. 25, 2013, in Co-Pending U.S. Appl. No. 13/659,817 by More, S., filed Oct. 24, 2012.
Classification Definitions Class 715, Data Processing: Presentation Processing of Document, Operator Interface Processing, and Screen Saver Display Processing; Feb. 2011; USPTO.gov, pp. 1-33.
"CS MAILsweeper™ 4.3 for SMTP" by Clearswift Ltd (© 2002).
"Middleboxes: Taxonomy and Issues," Internet Engineering TaskForce (IETF), RFC 3234 (Feb. 2002).
"MIME (Multipurpose Internet Mail Extensions): Mechanisms forSpecifying and Describing the Format of Internet Message Bodies," Internet Engineering Task Force (IETF), RFC 1341 (Jun. 1992).
"Workshare Launches Compare Service—First Web Services Version of Gold Standard Deltaview Document Comparison Tool", Workshare Press Release, Nov. 17, 2005.
Advisory Action dated Nov. 1, 2013, in Co-Pending U.S. Appl. No. 13/659,793 by More, S., filed Oct. 24, 2012.
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bobba et al. Attribute-Based Messaging: Access Control and Confidentiality, 2010, ACM 35 pages.
Cawood, Stephen. How to Do Everything™ Microsoft® SharePoint® 2010. McGraw-Hill, 2010. ISBN 978-0-07-174367-9 (pbk). Copyright © 2010.
Chen et al., Online Detection and Prevention of Phishing Attacks, 2006, IEEE 7 pages.
Co-Pending U.S. Appl. No. 10/023,010, filed Dec. 17, 2001.
Co-Pending U.S. Appl. No. 10/136,733, filed Apr. 30, 2002.
Co-Pending U.S. Appl. No. 12/177,043, filed Jul. 21, 2008.
Co-Pending U.S. Appl. No. 12/209,082, filed Sep. 11, 2008.
Co-Pending U.S. Appl. No. 12/209,096, filed Sep. 11, 2008.
Co-Pending U.S. Appl. No. 12/275,185, filed Nov. 20, 2008.
Co-Pending U.S. Appl. No. 12/621,429, filed Nov. 18, 2009.
Co-Pending U.S. Appl. No. 12/844,818, filed Jul. 27, 2010.
Co-Pending U.S. Appl. No. 13/306,798, filed Nov. 29, 2011.
Co-Pending U.S. Appl. No. 13/306,819, filed Nov. 29, 2011.

(56) References Cited

OTHER PUBLICATIONS

Co-Pending U.S. Appl. No. 13/620,364, filed Sep. 14, 2012.
Co-Pending U.S. Appl. No. 13/659,793, filed Oct. 24, 2012.
Co-Pending U.S. Appl. No. 13/659,817, filed Oct. 24, 2012.
Dominik Grolimund et al., Cryptree: A Folder Tree Structure for Cryptographic File Systems, Oct. 2-4, 2006, IEEE, pp. 189-198.
Final office action dated Aug. 15, 2012 for U.S. Appl. No. 11/336,329 which published as U.S. Pub. No. 2007/0174766 for "Hidden document data removal" to Rubin et. al.
Final Office Action dated Apr. 16, 2012 in Co-Pending U.S. Appl. No. 12/177,043, filed Jul. 21, 2008.
Final Office Action dated Aug. 12, 2011 for U.S. Appl. No. 12/209,096, filed Sep. 11, 2008.
Final Office Action dated Aug. 16, 2013 in co-pending U.S. Appl. No. 13/306,798 of Glover, R.W., filed Nov. 29, 2011.
Final Office Action dated Feb. 1, 2013 in Co-Pending U.S. Appl. No. 12/621,429 of More, S., filed Nov. 18, 2009.
Final Office Action dated Jan. 18, 2013 in Co-Pending U.S. Appl. No. 12/844,818 of Glover, R., filed Jul. 27, 2010.
Final Office Action dated May 10, 2012 in Co-Pending U.S. Appl. No. 12/209,082.
Final Office Action dated Oct. 21, 2013, in Co-Pending U.S. Appl. No. 13/659,793 by More, S., filed Oct. 24, 2012.
Greg Shultz, article "Keep Microsoft Office Documents Clean with iScrub," published by TechRepublic.com on Jul. 9, 2003.
International Search Report of PCT Application No. PCT/IB2002/005821, dated Jan. 30, 2004, 6 pages.
International Search Report of PCT Application No. PCT/2009/064919, dated Jul. 1, 2010, 3 pages.

\* cited by examiner

SYSTEM AND METHOD FOR DETERMINING DOCUMENT VERSION GENEOLOGY

PRIORITY CLAIM

This application claims priority as a continuation-in-part to U.S. application Ser. No. 15/819,640 filed on Nov. 21, 2017, which claims the benefit of U.S. Prov. Pat. App. No. 62/424,811, filed on Nov. 21, 2016, and as a continuation of U.S. patent application Ser. No. 14/980,173 filed on Dec. 28, 2015 which claims priority to U.S. Provisional Patent Application No. 62/097,190 filed on Dec. 29, 2014, all of which are incorporated herein in their entireties for all that they teach.

FIELD OF INVENTION

The present invention generally relates to the field of electronic document management where multiple versions of one or more documents have a complex geneology.

BACKGROUND

In many business situations it is common for multiple versions of one or more documents to be created. Some businesses use tools such as Document Management Systems (DMS) or other content repositories to try to track and store each version of the document that is created. Even when such systems are in use, versions tend to be created and/or stored in locations outside the DMS when copies of the document are sent by email, received from 3rd party contributors, copied for offline editing, etc. This problem is most acute for document formats that encourage editing (such as Microsoft™ Office™ format documents) as opposed to document formats which are largely used for presentation of a final copy (such as Adobe™ PDF documents).

The problem facing a document author or collaborator is often this: having received or found a new version of a document, how do they decide what to do with it? Was the version of a document that has arrived in an email message created by editing the most recent version stored in the DMS? Was it created by editing an older version of the document? Is it just a duplicate of some other version of the document? Depending on the answers to these questions, different actions are required—for instance in the first case of the document being created by editing the latest DMS version it is likely enough just to save the received version as a new version into the DMS. In the second case it is likely that the changes made to the received version need to be merged into the latest DMS version, while in the last case no action at all may be required.

In these circumstances, a software tool capable of determining the genealogical relationships between document versions automatically would provide great value as it would provide the document author/collaborator with relevant information allowing them to make a proper decision on the action needed when new versions of a document are located or received. In order to be useful in the situations described above, the tool must be capable of determining genealogical relationships based on the content of the documents only, as other meta-information such as DMS version information, file names, file timestamps, etc., may not be present or may be modified in some or all versions located outside the DMS—for instance copied files may have altered names or timestamps and files sent via email may have lost their original timestamp.

A tool capable of determining document genealogy from content only would also be useful in the context of document forensics—in cases where large collections of documents and versions of documents have been collected and investigators wish to piece together the history of the document or documents involved.

SUMMARY

One embodiment of the invention applies to word processing documents in the RTF, DOC, DOCX and DOCM formats, which are most frequently edited using Microsoft Word™. Recent versions of Microsoft Word (since at least Word 2003) have included a feature where a random integer of up to 4 bytes length, named a Revision Sequence ID or RSID, is added to the document for every editing session that the document undergoes. Microsoft Word itself uses this information to help in the process of merging documents—to determine whether a change noted between two versions was an insertion by author 'A' or a deletion by author 'B', however the list of RSIDs also provides information that can be used to accurately recreate the genealogy of a set of documents.

The storage of RSIDs in the different document file formats (RTF, DOC, DOCX, DOCM, etc.) is specified in the freely available Microsoft documentation for these file formats. Therefore, one embodiment of the invention includes a module that examines a set of RTF, DOC, DOCX, DOCM or other files provided as input and extracts the RSIDs for those files (101). This embodiment builds a data structure that tabulates an identifier for the file with that files' extracted RSID (104). This data structure is then used by the rest of the embodiment of the invention.

The use of RSIDs within each document format is actually quite complicated, but for the purposes of determining document version genealogy, all that is required is the complete set of all RSIDs present in the document version of interest. Although the specifications for the file formats seem to allow for RSIDs to take an integer value of 4 bytes length (i.e. between 0 and 232-1), in practice Microsoft Word only seems to allocate values of up to 3 bytes in length (i.e. between 0 and 224-1). This may be an implementation detail that could change in future versions of Microsoft Word and in any case the range allowed for the RSID values does not impact the methods described here other than the size of the RSID data structure and the speed of execution of embodiments of the invention.

In practice, Microsoft Word may assign more than one new RSID for each editing session, tests indicating that one is added when the document is opened and another each time it is saved to disk. Note that if the document is opened, but not modified or saved, even if new RSIDs are created within the memory of the Microsoft Word application, they will not be stored to the document file (as it is not saved) and are thus discarded without trace when the document is closed. The fact that the number of RSIDs added to the document per editing session may be greater than one does not affect the techniques described here.

Given that new RSIDs are added to the document each time it is modified and saved, it follows that if two document versions A and B are encountered the invention can determine that version B is an ancestor of version A when the following two conditions hold true There are at least some RSID values in common between the two versions; and The set of RSIDs derived from version B is a proper subset of the set of RSIDs derived from version A.

Based upon this principle and other similar derivations the invention can determine the genealogy of a set of documents from their RSIDs.

One embodiment of the invention uses RSID values in documents to determine genealogy. RSID is an example of a string of alpha-numeric values that are unique to a sequence of document revisions that is created as a result of the document being opened for editing, whether as a result of commencing such an editing session or saving the revision for the last time when concluding the editing session. However the invention can utilize any kind of editing session identifier or other identifier that is uniquely associated with the document version being created during a document editing session. When a document editing session results in a revision identifier associated with that session to be cumulatively added to a set of prior revision identifiers already present in the metadata of the document, those revision identifiers can be used by the invention to determine document genealogy as described herein for RSID values.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Figure 1:
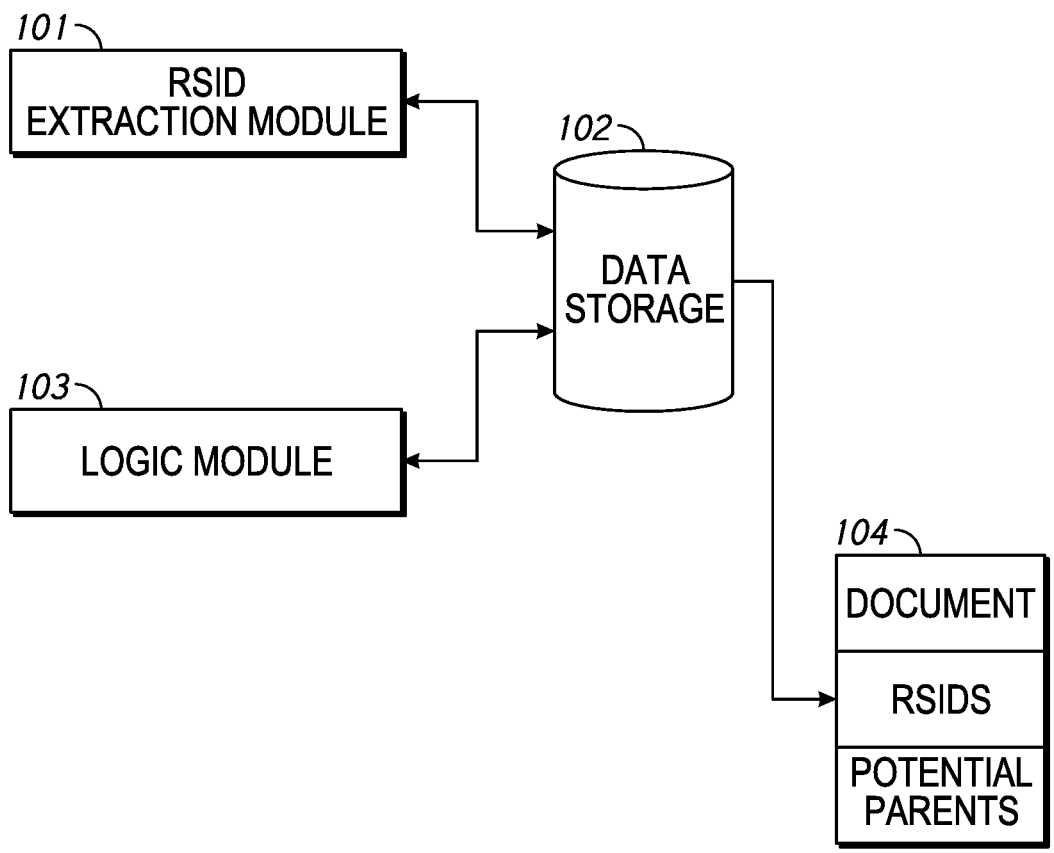
FIG. 1: Example system architecture for an embodiment of the invention.
Figure 2:
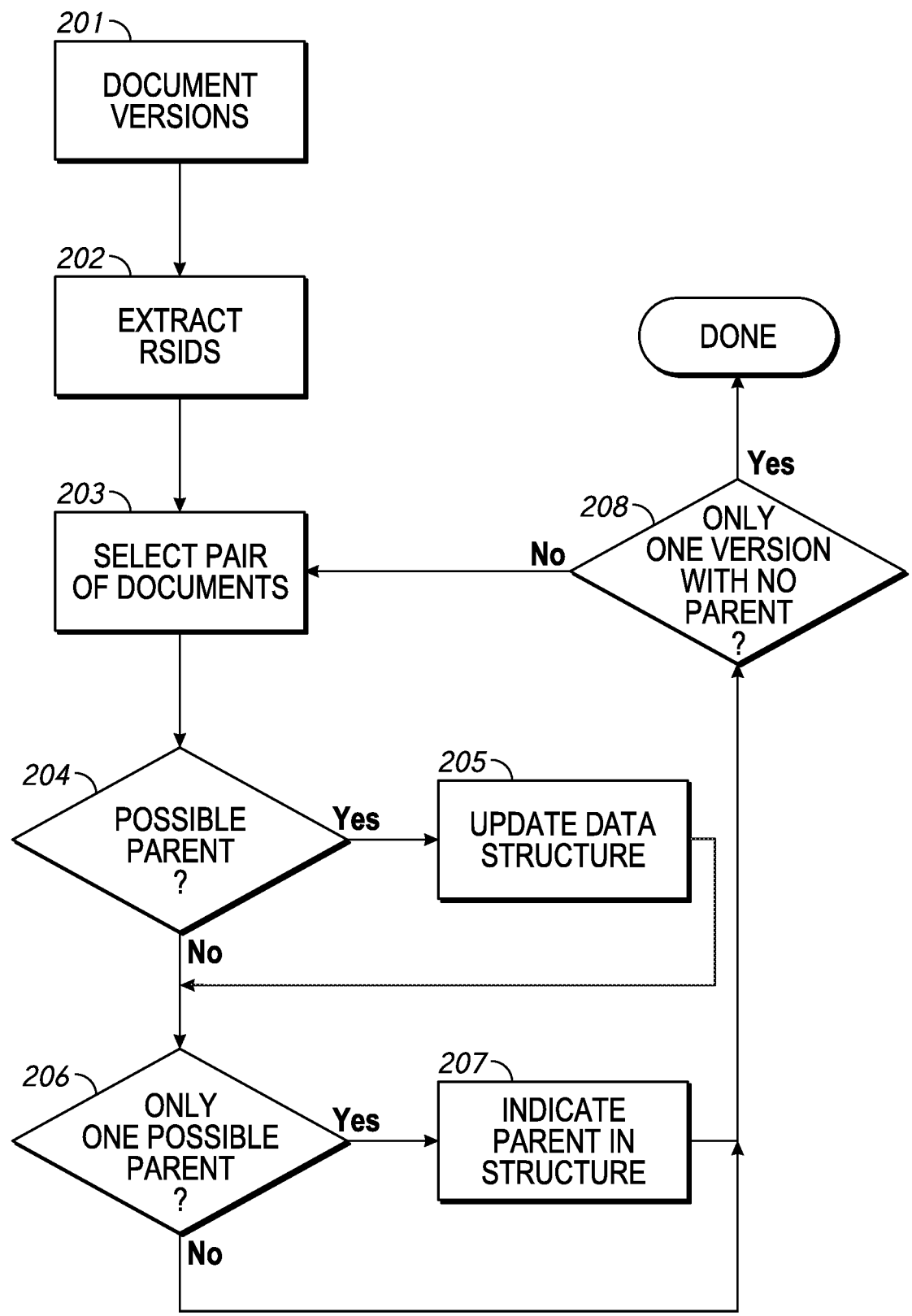
FIG. 2: Example flow chart for an embodiment of the invention.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Consider document versions A, B, C, etc. Let the set of RSIDs associated with each version be $R_A$, $R_B$, $R_C$, etc. Let the mathematical symbol '<' be used to denote ancestry, so that A<B can be read as 'Version A is an ancestor of Version B'. Let T(A,B) indicate that versions A and B belong to the same genealogical version tree. Let E(A,B) indicate that the versions A and B have equal RSIDs and therefore cannot be distinguished by this methodology. Therefore we have the following logical conditions:

$$R_A = R_B \rightarrow E(A,B) \qquad (1)$$

$$R_A \cap R_B \neq \emptyset \rightarrow T(A,B) \qquad (2)$$

$$R_A \subset R_B \rightarrow A < B \qquad (3)$$

$$T(A,B) \text{ and } R_A \not\subset R_B \text{ and } R_B \not\subset R_A \rightarrow \exists C : C < A, C < B, R_C = R_A \cap R_B \qquad (4)$$

These four logical equations can be interpreted as (1) If two versions A and B have identical sets of RSIDs then they are equivalent for the point of view of determining genealogy (2) If two versions A and B have any RSIDs in common then they belong to the same genealogical version tree. Conversely, if two versions A and B have no versions in common then they belong in different version trees.

(3) If the RSIDs of version A are a proper subset (i.e. not including equality) of the RSIDs of version B then version A is an ancestor of version B.

(4) If two versions A and B belong in the same tree, but neither has RSIDs which are a subset of the other then there must have existed a version C that is a common ancestor of both versions A and B, i.e. the RSIDs of C are a subset of those of both A and B.

Preliminary steps before the construction of a genealogical tree for a set of documents proceeds as follows:

The contents of each document to be considered are passed to the RSID extraction module (there may be multiple RSID extraction modules to handle different source file formats). (101). The RSIDs extracted by the module are stored in a list in a data structure along with meta-information about the file they were extracted from (for instance the source location of that file). (104). The data structure is stored in computer memory and a mass storage device (102).

In an alternative embodiment, equivalent versions are detected and removed from consideration by the use of equation 1. Documents with equal RSID sets may be detected by comparing the RSID set of each document under consideration with the RSID set of each other document, or, more efficiently, by using a hash table or other similar optimized data structure. If equivalent versions are detected the duplicates may simply be removed with only one of the set of equivalent versions being retained. Alternatively information about the duplicates may be attached to the data structure representing the version that is retained for later use.

The documents under consideration are grouped into related groups by the use of equation 2. Initially the collection of related groups is empty. Each document is tested against each group in the collection of related groups and if it has any RSIDs in common with any document in the group, it is added to that group. If the document fails to match any existing group, it is used to create a new group. Membership in a group can be indicated in the data structure by an entry that when null indicates no membership and when not null is a label value the module creates to be associated with the group.

In some circumstances the documents supplied may be known to all belong to a single group, in which this step can be skipped.

Use of standard document templates within an organization may lead to all documents in the organization sharing a certain number of RSIDs—those that they inherit from the standard template—in that case the condition for belonging to the same version tree (and hence being added to the same related group) may be altered to require a number of matching RSIDs that is bigger than some non-zero number. In an alternative embodiment, the RSID values associated with the template may be ignored for purposes of applying the geneology logic presented above. In other words, the fact that two document share only the RSID values that exist in a document template provides no useful information as to geneology of the document versions.

Other information may be used to assist related group construction, for instance document fingerprinting techniques such as Robust Winnowing (http://theory.stanford.edu/~aiken/publications/papers/sigmod03.pdf) may be used to help divide the original set of all input documents into groups.

Once a set of related groups have been constructed, a genealogical tree is determined for each group which has more than one member document. This is accomplished by the logic module (103) that applies logic rules to the extracted RSIDs. Note that all members of a given related document group are already determined to be versions of the same document—they will now be referred to as versions throughout the remaining description. This step is the primary step of the invention and proceeds as follows:

1. Each version in the group, A, is tested against each other version in the group, B. (203). If the RSID set of A is a proper subset of the RSID set of B, then by equation 3, A is an ancestor of B. (204). In this case, version A is added to a list of 'potential parents' stored in the data structure representing version B. (205). After this process is complete, each document version has a list of potential parent versions. There can be no loops in this structure because it is derived from the RSIDs being proper subsets—i.e. consider the list of versions that can be reached from a version A by following each of its possible parents, then each of the possible parents of those versions, etc. It is impossible for A itself to appear in this list.

2. Each version A in the group that has not had its parent version determined already is tested to determine if it has only one version in its list of potential parents. (206). If there is one and only one version P in the list of potential parents then the following steps are taken:
   Version A's parent version is now determined to be version P. (207). Version P is stored as the parent version in the data structure associated with version A. Version A is added to the data structure associated with version P as one of P's child versions.
   Each other version C in the group is checked to see if both A and P appear in C's list of potential parents. If both appear then P is removed from the list.

3. Step 2 is repeated until it fails to determine any more parent versions.

4. The number of versions in the group without a determined parent version is counted—if the count is 1 then the determination of the genealogical tree is complete and the algorithm terminates (the version without a determined parent is the version that is at the root of the tree). (208) Note that it is impossible to find zero versions with no parent determined as this would involve a loop in the parent child relationship.

5. At this stage, equation 4 is used to infer the existence of missing versions that must have once existed but are not included in the related group because they have been lost, deleted or simply not presented to the algorithm. The list of versions with no parent determined is calculated and each possible pair of versions A, B from this list is considered. Equation 4 would allow us to infer the existence of a missing version C from each pair A, B, but instead the algorithm at this stage only deduces the existence of a single missing version C from all the possible C's such that the number of RSIDs in $R_C$ is a maximum.
   Once this new version C has been constructed it is added to the related group.

6. Newly created version C is tested against each other version in the group, D. If $R_D \subset R_C$ then D is added to the potential parent list of C. If $R_C \subset R_D$ then C is added to the potential parent list of D. This updates the potential parent lists of all versions to be consistent with the state that would have been achieved if C was part of the related group at step 1.

7. The algorithm now returns to step 2.

At the end of this procedure, there will only be a single version remaining (the root version) with no parent version determined. The procedure will have possibly created several 'missing versions' where it can determine that two versions are related to each other as siblings but that there common ancestor has not been presented to the algorithm. The choice in step 5 of creating a single synthesized missing version such that the number of RSIDs in $R_C$ is at a maximum is important as it ensures that the fewest children are attached to each synthesized version and that thus the most detailed tree possible is generated. Constructing a synthesized missing version from the minimum number of intersecting RSIDs would instead lead to a tree where many child versions attached themselves to that new version, making the tree very wide but less deep and containing less information regarding detailed ancestry.

In yet another embodiment of the invention, the system is adapted to rely on codes extracted from the content in the versions itself. This would be useful in situations where the RSIDs are not used, for example, for text documents extracted from scanned data and the like. In this embodiment, numerical values called fingerprints are extracted from each document. The relative distance in value between fingerprints can provide an indication of the relative differences in the documents. By means of these distances, a relative geneology of the document versions can be determined automatically. String matching algorithms can be used to identify identical sections of the documents. One logical rule in this embodiment is that two versions that have a high number of identical strings are more likely to be closely related to than two with fewer. The relative distance between document versions can be used to determine a hierarchy that is the expected geneology of the document versions.

Operating Environment:

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The remote computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system may also be comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps.

In one embodiment, a user's computer can run an application that causes the user's computer to transmit a stream of one or more data packets across a data network to a second computer, referred to here as a server. The server, in turn, may be connected to one or more mass data storage devices where the database is stored. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be one or more data packets transmitted from or received by a computer containing a destination network address, a destination process or application identifier, and data values that can be parsed at the destination computer located at the destination network address by the destination process in order that the relevant data values are extracted and used by the destination process.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

In addition, the user's computer may obtain data from the server that is considered a website, that is, a collection of data files that when retrieved by the user's computer and rendered by a program running on the user's computer, displays on the display screen of the user's computer text, images, video and in some cases outputs audio.

The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

It is appreciated that any of the software components of the present invention may, if desired, be implemented in ROM (read-only memory) form. The software components may, generally, be implemented in hardware, if desired, using conventional techniques. In some instances, especially where a mobile computing device is used to access web content through the network (e.g., when a 3G or an LTE service of a mobile phone is used to connect to the network), the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), or Voice over Internet Protocol (VoIP), Unlicensed Mobile Access (UMA).

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Also, while processes or blocks are at times shown as being performed in series, these processes or blocks may instead be performed or implemented in parallel, or may be performed at different times.

What is claimed:

1. A computer system comprised of at least one computer and at least one data storage device for determining the relative genealogy of a predetermined set of versions of a document data files stored on the computer system, said computer system comprising:
   an extraction module adapted by logic to extract a set of at least one revision identifier values from each of the predetermined set of document versions, generate and store in computer memory a data structure that encodes the genealogy of the predetermined set of document versions;
   a logic module adapted by logic to select at least one pair of revision identifier sets comprised of a first revision identifier set and a second revision identifier set corresponding to a at least one selected pair of versions of the document associated with the corresponding at least one pair of selected revision identifier sets, and apply at least one of a predetermined set of logic rules to the selected pair of revision identifier sets said logic rules being at least one of:
   (i) testing whether the pair of revision identifier sets are identical; (ii) testing whether any of the revision identifier values in the first set are the same as any revision identifier values in the second set; (iii) testing whether all of the revision identifier values in the first set are a proper subset of the revision identifier values of the second set; or (iv) testing whether neither the first set of revision identifier values is a subset of the second set of revision identifier values nor the second set of revision identifier values are subset of the first set of revision identifier values,
   and to update the stored data structure with either an identifier entry for one of the versions in the corresponding at least one pair of versions referring to its genealogical relation to the other version.

2. The computer system of claim 1 further comprising a module adapted by logic to apply logical rules to the extracted revision identifier sets of values in order to determine which of the selected document versions are within a group and to update the data structure to indicate for each document version, membership in the group, whereby the logical module is further adapted to check for potential parentage within the group and determine version genealogy within the group.

3. The computer system of claim 1 where the logic module is further adapted by logic to determine if there are missing versions of the document that are not included in the set of versions being checked for their genealogy.

4. The computer system of claim 3 where the logic module is further adapted by logic to determine for the selected pair of document versions in the set, A, B, whether versions A and B belong in the same genealogical tree, but neither A nor B has revision identifier values which are a subset of the other version in order to determine a logic state representing the condition that there must have existed a version C that is a common ancestor of both versions A and B.

5. The computer system of claim 1 where the system is adapted by logic to ignore equivalent versions of the document by means of determining that a pair of the document versions have identical sets of revision identifier values.

6. The computer system of claim 1 where the logic module is further adapted by logic to determine whether for each pair of document versions in the set, whether the pair of document versions have any revision identifier values in common.

7. The computer system of claim 1 where the logic module is further adapted by logic to ignore a predetermined sub-set of the same revision identifier values extracted from the selected pair of document versions.

8. The computer system of claim 1 where the logic module is further adapted by logic to determine potential parentage by checking whether the extracted pair of revision identifier sets of a first pair of document versions is a proper subset of the extracted revision identifier values of a second pair of document versions.

9. A method executed by a computer system comprised of at least one computer and at least one data storage device for determining the relative genealogy of a predetermined set of versions of a document data file stored on the system comprising:
   extracting a set of at least one revision identifier values from each of the predetermined set of document versions, generating and storing in computer memory a data structure for encoding the genealogy of the predetermined set of document versions;
   selecting at least one pair of revision identifier sets comprised of a first revision identifier set and a second revision identifier set corresponding to a selected pair of versions of the document;
   applying at least one of a predetermined set of logic rules to the selected at least one pairs of revision identifier sets, said logic rules being at least one of:
   (i) testing whether the pair of revision identifier sets are identical; (ii) testing whether any of the revision identifier values in the first set are the same as any revision identifier values in the second set; (iii) testing whether all of the revision identifier values in the first set are a proper subset of the revision identifier values of the second set; or (iv) testing whether neither the first set of revision identifier values is a subset of the second set of revision identifier values nor the second set of revision identifier values are subset of the first set of revision identifier values, and
   updating the stored data structure with either an identifier entry for one of the versions in the corresponding at least one pair of versions referring to its genealogical relation to the other version.

10. The method of claim 9 further comprising:
    applying logical rules to the extracted revision identifier sets of values in order to determine which of the selected document versions are within a group;
    updating the data structure to indicate for each version in the set of document versions membership in the group; and
    checking for potential parentage within the group to determine version genealogy within the group.

11. The method of claim 9 further comprising: determining if there are missing versions of the document that are not included in the set of versions being checked for their genealogy.

12. The method of claim 11 further comprising:
selecting at least one pair of document versions A, B;
determining that neither version A nor B has revision identifier values which are a subset of the revision identifier values of the other version in order to determine a logic state representing the condition that there must have existed a version C that is a common ancestor of both versions A and B.

13. The method of claim 9 further comprising: ignoring equivalent versions of the document by means of determining that a pair of the document versions have identical sets of revision identifier values.

14. The method of claim 9 further comprising: determining whether for each pair of document versions, whether the versions have any revision identifier values in common.

15. The method of claim 9 further comprising: ignoring a predetermined sub-set of the same revision identifier values extracted from the selected document versions.

16. The method of claim 9 further comprising: determining potential parentage by checking whether the extracted revision identifier set of a first of the pair of document versions is a proper subset of the extracted revision identifier set of values of a second of the pair of document versions.

17. The computer system of claim 1 further adapted by logic to determine that the genealogy within the set of versions is complete by determining that for only one version of the document in the set of document versions has a genealogical relation of parentage assigned a logic value representing no parentage.

18. The method of claim 9 further comprising the step of determining that the genealogy within the set of document versions is complete by determining that only one version of the document in the set of document versions has a genealogical relation of parentage assigned a logic value representing no parentage.

19. The computer system of claim 3 further adapted by logic to create and store at least one revision identifier set of values corresponding to at least one of the missing document versions and applying a logic rule to the created revision identifier set to determine its position in the version genealogy, said logic rule being a test whether for one of any document version in the set, whether the created revision identifier set corresponding to the missing document version is a subset of the revision identifier set of the one document, or that the revision identifier set of the one document is a subset of the created revision identifier set corresponding to the missing document version.

20. The method of claim 11 further comprising:
creating and storing at least one revision identifier set of values corresponding to at least one of the missing document versions; and applying a logic rule to the created revision identifier set to determine its position in the version genealogy, said logic rule being a test whether for one of any document version in the set, whether the created revision identifier set corresponding to the missing document version is a subset of the revision identifier set of the one document, or that the revision identifier set of the one document is a subset of the created revision identifier set corresponding to the missing document version.

* * * * *